United States Patent Office 3,658,980
Patented Apr. 25, 1972

3,658,980
INTERNAL ADDITIVE FOR CONTROLLED CO-HESION IN POLYMERIZED OLEFIN FILMS
Robert Joseph Caiola, Saginaw, William F. Mick, Midland, and Oliver Bernard Amley, Sanford, Mich., assignors to The Dow Chemical Company, Midland, Mich.
No Drawing. Filed Sept. 23, 1968, Ser. No. 761,812
Int. Cl. B29d 7/02; D01f 1/02
U.S. Cl. 264—210
6 Claims

ABSTRACT OF THE DISCLOSURE

Cohesive polymerized olefin films are prepared by (a) intimately admixing a polymerized olefin, such as polyethylene, with a small amount of a viscous liquid, such as polypropylene glycol having a molecular weight of 2,000, and (b) extruding the resulting mixture in the form of a thin, transparent flexible sheet.

BACKGROUND OF THE INVENTION

This invention relates to improvements in protective wrapping materials constructed of polymerized olefin film, and more particularly to polymerized olefin film having improved self-adhering properties.

While many different materials, e.g., waxed papers, plastic coated papers, and aluminum foil, are used as protective wrapping, the thermoplastic organic resin films such as polyethylene and polyvinylidene chloride are most widely used because of their low vapor transmission properties and resistance to mechanical and chemical deterioration. However, in many instances, especially in the case of polyethylene, the thermoplastic organic resin does not have sufficient cohesion to adhere to itself when a small amount of pressure is applied, and therefore often does not adequately seal in flavor, moisture, and other desirable properties of fresh foods. Although heat sealing is a possible means of achieving the desired protection, it usually is not available or is too expensive for household use.

It is known to improve cohesion of polyethylene films by coating the film with a layer of surface modifiers as described in U.S. Pat. 3,070,462. However, in order to spread a uniform layer of the surface modifier over the film, it is necessary to use a surfactant or wetting agent. In most instances, however, the amount of cohesion imparted to the film is not as readily controlled as is usually desired. Problems often arise in recovering the liquid diluent used in applying coating and so forth.

For these and other reasons it would be highly desirable to provide a thermoplastic organic resinous film having inherent cohesion properties sufficient to enable it to form a seal upon the application of a small amount of pressure, yet which seal can be pulled apart without tearing or otherwise destroying the film.

SUMMARY OF THE INVENTION

Accordingly, the present invention is a cohesive film of a polymerized olefin and a method for the preparation thereof, said film, hereinafter described in detail, being prepared by an extrusion method comprising the steps of (a) intimately admixing with normally solid polymerized olefin from about 0.04 weight percent to about 4 weight percent of a liquid having molecular weight up to about 5,000, vapor pressure below atmospheric pressure at temperatures just above the film melt extrusion temperature and Saybolt viscosity of at least 100 centistokes at 77° F. and (b) extruding the resulting mixture in the form of a thin, transparent, flexible sheet. In one embodiment, the sheet is cooled by extruding it onto a chilled roll and drawing the sheet to form a film having an average thickness from about 0.3 mil to about 2.0 mils. The resulting film exhibits better cohesion properties than polymerized olefin films which contain no cohesion promoting liquid. Such improved cohesion properties result from semi-continuous layers of the cohesion-promoting liquid which form on the surfaces of the film as a consequence of molecules of the liquid, present as an internal additive in the polymerized olefin, migrating to the surfaces of the extruded film. One of the primary advantages of using the method of this invention over methods in which films having improved cling are prepared by coating the film with a layer of a cohesion-promoting liquid is that the problems encountered in spreading such liquids over the surfaces of the film are avoided and additional processing steps required to recover liquid diluents, to dry the film, etc., are eliminated.

In addition to good cohesion properties, the films of this invention also exhibit low vapor and liquid permeability, good resistance to chemical and mechanical deterioration, and good resistance to fogging. These films are used primarily as protective wrappings for foods such as meats, fruits, vegetables and the like; such films are also used in the production of bags and other containers for storing oily materials, and materials which are sensitive to oxygen and the like.

DESCRIPTION OF THE PREFERRED EMBODIMENTS

The films of this invention require as essential ingredients, (1) a normally solid polymerized olefin and (2) a liquid having molecular weight up to about 5,000, vapor pressure below atmospheric pressure at temperatures just above the film melt extrusion temperature, and Saybolt viscosity of at least 100 centistokes at 77° F.

Polymerized olefins for the purposes of this invention includes the normally solid, thermoplastic, organic polymers which comprise at least 60 weight percent of an alpha-olefin having from 2 to 18 carbon atoms, and especially the homopolymers and copolymers of ethylene. Examples of suitable $\alpha$-olefins include ethylene, propylene, butene-1, hexene-1, octene-1, and mixed higher alpha-olefins. In addition to the homopolymers and copolymers of the alpha-olefins, suitable polymers also include copolymers of one or more alpha-olefins with other comonomers, for example, the monosubstituted ethylenes, e.g., vinylcyclohexene, allyl benzene, styrene, allyl naphthalene and the like; 1,1-disubstituted ethylenes, e.g., alpha-methyl styrene, 2-methyl butene-1, mixed alpha- and beta-pinenes, camphene, and the like; 1,2-disubstituted ethylenes, e.g., indene, acenaphthylene, cyclopentene, norbornylene, cyclohexene, trans-stilbene, 2-pentene and the like; conjugated dienes and trienes, e.g., pentadiene-1,3, 1,2 - dihydrobenzene, alloocimene, and cyclopentadiene; unconjugated dienes, e.g., mixed octadienes, hexadiene-1,5, 2,5 - dimethylhexadiene - 1,5, 1,4 - dihydrobenzene, bicycloheptadiene, bicyclopentadiene, 4-vinylcyclohexene-1, and 4,7-diphenyldecadiene-1,9; acetylenes, e.g., isopropenyl acetylene and phenyl acetylene; chloro-olefins, e.g., beta-methallyl chloride, chloromethyl norbornylene, and m-chlorostyrene; esters; epoxides; the vinyl esters of saturated carboxylic acids, e.g., vinyl acetate, vinyl propionate, vinyl butyrate, and the like; e.g., the esters of alpha,beta-ethylenically unsaturated carboxylic acids, e.g., ethyl acrylate, methyl methacrylate, ethyl fumarate, diethyl maleate, and the like; and nitrogen compounds such as vinyl carbazole, 4-vinyl pyridine, and acrylonitrile. Blends of such polymers and copolymers can also be employed to make the polymerized olefin.

It is a critical requirement of this invention that the extruded plastic film product contain the specified amount of a liquid having the following characteristics: molecular weight up to about 5,000, vapor pressure below atmospheric pressure at temperatures just above the film melt extrusion temperature, and thermal stability at such temperatures, and Saybolt viscosity of at least 100 centistokes at 77° F. For the purposes of this invention a liquid is thermally stable at a given temperature if it does not decompose to form components which have vapor pressures above atmospheric pressure at the given temperature. Usually a liquid having the required properties is chosen and incorporated into the polymerized olefin before or during fabrication. However, a material, not necessarily a liquid, which does not per se have all of the required properties, but which is converted to a liquid having such properties during the fabrication process, can be suitably used in the plastic composition. For example, a polypropylene glycol having molecular weight of 15,000 which (during the film fabrication) decomposes to a polypropylene glycol having molecular weight of 2,000 is a suitable material. The same reasoning would apply to a material having a very low molecular weight and low viscosity which material upon heating to film melt extrusion temperature would cross-link to form a liquid having the required molecular weight and viscosity.

The liquid in the extruded film product must have molecular weight such that it can migrate rapidly throughout the polymeric structure. Molecules of liquids having molecular weights less than 5,000 are capable of passing unhindered between the lattices of the polymeric structure thus diffuse or migrate rapidly to the surface of the film. In contrast thereto large molecules being of a more bulky nature have long tails which tend to hook or wrap around portions of the polymeric structure. As a result, large molecules diffuse slowly and consequently will not migrate in a reasonable amount of time, usually up to about 2 months. It is found that liquids having molecular weights up to about 5,000 are operable, with preferred liquids having molecular weights between about 300 and about 3,000.

In order for the cohesion-promoting liquid to be present in the polymer following the extrusion process, the liquid must have a vapor pressure below atmospheric pressure at temperatures just above the film melt extrusion temperature. To satisfy this requirement, the liquid generally must have a boiling point above 285° C.

The liquid in the extruded film product must have sufficient cohesive energy to impart the requisite cling or cohesion properties to the film. Liquids having viscosities below 100 centistokes at 77° F. do not improve cohesion appreciably and are therefore not operable for the purposes of this invention.

In order to minimize optical problems such as haze, it is preferable that the liquid have a refractive index about the same as that of the polymerized olefin or otherwise have a surface tension such that the liquid will wet the entire surface of the polymerized olefin; in the case of polyethylene films the liquid has a surface tension less than 30 dynes/centimeter.

As indicated above, suitable liquids can possess virtually any chemical structure provided that they have the required physical properties as described. For the purposes of illustrating the invention, typical liquids having the aforementioned characteristics are given as follows: the polyalkylene ether diols, e.g., polyethylene glycol, polypropylene glycol, polybutylene glycol and the like; polyepichlorohydrin, trihydric and higher polyhydric alcohols, e.g., glycerol, sorbitol, mannitol, and the like; the liquid esters of the high molecular weight fatty acids, e.g., sorbitan monooleate, sorbitan monolaurate, sorbitan trioleate, sorbitan tristearate, sorbitan sesquioleate, sorbitan monostearate, sorbitan monopalmitate, polyoxyethylene sorbitan monostearate, polyoxyethylene monooleate, polyoxyethylene sorbitan monolaurate, polyoxyethylene monostearate, polyoxyethylene dioleate, polyoxyethylene monolaurate, and the like; the vegetable oils, e.g., peanut, olive, cottonseed, soybean, corn, coconut and castor oils; and the polyethers; e.g., polyoxyethylene lauryl ether, polyoxyethylene oleyl ether, polyoxyethylene aryl alkyl ether, polyoxyethylene cetyl ether and the like. Preferred liquids are the polymers of dihydric alcohols with an especially preferred liquid being polypropylene glycol having a molecular weight of 2,000.

Films of polymerized olefins prepared in the practice of this invention contain from about 96 to about 99.96 weight percent of a polymerized olefin and from about 0.04 to about 4 weight percent of a suitable cohesion-promoting liquid. While preferred concentrations of the liquid vary with the viscosity of the liquid, the amount of cohesion desired, and the smoothness of the film surface, generally preferred concentrations of liquids for the purposes of the invention range from about 0.125 to about 2 weight percent. As a rule the smooth surface films require less liquid for a given amount of cohesion than do the rough surface films, e.g., an embossed film. For example, whereas a typical smooth surface polyethylene film may require from about 0.25 to about 0.5 weight percent of the liquid to give a certain cohesion, as much as 2 to 4 weight percent of the same liquid is usually required to give the same cohesion in an embossed film.

The cohesive films of this invention are readily prepared by (1) intimately admixing a polymerized olefin with a suitable liquid and (2) extruding the resulting mixture in the form of a clear flexible sheet which is subsequently cooled in a draw-down procedure to form a film having an average thickness from about 0.3 mil to about 2.0 mils. In one embodiment the thin sheet is extruded and drawn onto a chill roll. In another embodiment, the heat plastified mixture of polymer and liquid is extruded through an annular die, blown into a bubble, cooled, collapsed and cut into film of desired length and width.

Mixing of the required components is readily carried out in a conventional mixing apparatus such as a Banbury mixer or screw type extruder. In one embodiment wherein the mixing device is a screw type extruder, the liquid is fed into the extruder at one or more points along the barrel of the extruder, preferably at a point about halfway along the barrel. The extruded mixture may be mixed with more virgin polymer prior to final extrusion or may be fed directly into an extruder equipped with a sheet die and extruded in the form of a transparent flexible sheet. In one extrusion operation the transparent sheet is extruded onto a chill roll and is drawn down to form a film having the desired thickness, usually between about 0.3 to about 2.0 mils. Suitable extrusion apparatus include a typical screw type extruder, an extruder equipped with a ramming device and the like.

In a preferred embodiment the mixing and extruding steps are carried out in a single apparatus which is a typical screw type extruder that is equipped with a sheet die and a liquid inlet placed along the extruder barrel which houses the screw or screws of the extruder. The cohesion-promoting liquid is introduced through the liquid inlet as the polymer is being extruded at a rate such that a constant mixture is maintained.

The following examples are given as illustrations of the invention and are not to be construed as limiting its scope. Throughout this specification and claims, all parts and percentages are by weight unless otherwise indicated.

EXAMPLE 1

A 90 part portion of polyethylene having a density of 0.93 and a melt index, as determined by ASTM D-1238-65T (E), of 2.9 decigrams/minute is mixed with 10 parts of polypropylene glycol having a molecular weight of about 2,000 and a Saybolt viscosity of 230 centistokes at 77° F. in a Welding Engineer's twin screw extruder wherein the polypropylene glycol is fed through a liquid inlet placed along the extruder barrel at a rate such that a reasonably constant mixture is maintained. The extruded mixture is cut in cylindrical pellets and is then blended with virgin polyethylene identical to that used in the mixture in a ratio of 1 part of extruded mixture to 19 parts of virgin polyethylene. This blend containing 0.5 weight percent of the polypropylene glycol is extruded through a two inch extruder equipped with a sheet die, said extrusion being carried out at approximately 285° C. The resulting molten sheet is drawn down with a chill roll maintained at 50° C. at 200 feet/minute to produce a clear flexible film having a smooth surface and thickness of 0.48 mil. An air knife maintained at an air pressure of 0.25 pound/square inch is used to force the molten sheet against the chill roll. The cohesion properties of the resulting film and seevral other films prepared in the same manner, but containing varied amounts of the polypropylene glycol are shown in the following Table I. Cohesion properties of a control sample film (C*) of the virgin polyethylene is also shown in Table I for purpose of comparison and is not an example of this invention.

TABLE I

|  | Percent additive | Cohesion, lbs.[1] | Cling[2] |
|---|---|---|---|
| Sample Number: | | | |
| 1 | 0.50 | 1.02 | 22.4 |
| 2 | 0.25 | 0.925 | 18.4 |
| 3 | 0.07 | 0.789 | 15.5 |
| 4 | 0.04 | 0.650 | 15.2 |
| 5 | 0.01 | 0.640 | 14.2 |
| C* | 0 | 0.579 | 13.6 |

[1] Determined by Film Lap Test for cohesion evaluation. The test consists of using a section of film having approximately the following dimensions—eight inches machine direction by 11–12 inches transverse direction. This sheet is cut in two equal pieces with a clean straight cut in the transverse direction. One of the sheets is then turned over so that the same film surfaces can be placed together. A half inch lap is then made using clean straight edge cuts. The lap is pressed lightly into place. One inch widths of film are then cut across the lap in the machine direction for pulling on the tensile testing machine. The sample cutting carried out in manner such that a uniform load may be placed on the lap is done on a JDC Precision Sample Cutter. The film on both sides of the lap, but not the lap itself, is reinforced with non-elongating material such as gummed paper. The specimen is placed in the jaws of tensile testing machine and subjected to separating force. The force is pounds required to shear the lap denotes the force required to separate the lap. Each value for cohesion given in the table about represents the average peak load required to shear the lap of 10 specimens of each film. The higher values indicate more cohesion.

[2] Determined by Hand Shake Test. A 12 inch square of film is wrapped about a sandwich consisting of two pieces of foamed polystyrene and aluminum plate glued between the pieces. The sandwich weighs about 160 grams and measures 3.8″ wide x 4.6″ long x 1.1″ thick. The film is wrapped about the sandwich in a conventional manner wherein (1) two opposing ends of the film are folded in toward the sandwich such that a first end contacts the total surface of the top surface of the sandwich and the second end lies on the first end, (2) the remaining ends are folded diagonally so as to form a point at the center of each end and (3) the pointed ends are then folded in toward the sandwich such that the resulting wrapped object is a rectangularly-shaped object. During wrapping, care is taken so that little or no extraneous liquid, e.g., sweat or oil, remains on the surface of the film. The sandwich is overturned so that the folded ends are on bottom and an 875 gram weight is placed on the sandwich for 20 seconds. The weight is removed and the sandwich is again overturned so that the ends are upright. Cling properties of film are rated as follows: 0–3, wrapping compeltely unfolds; 4–7, sandwich falls out when picked up by one of folded loose ends; 8, wrapping given a rating of 8 if sandwich stays wrapped when picked up by one end of wrapping. The sandwich is then shaken gently and for each shake that sandwich stays wrapped add one point to 8. Preferred sandwich wraps exhibit cling values between 15 and 25. The cling values are average values for 10 tests.

*Not an example of this invention.

EXAMPLE 2

A cohesive polyethylene film having a smooth surface is prepared according to the procedure of Example 1 except that 5 parts of polyepichlorohydrin having molecular weight of 450 and Saybolt viscosity of 1.070 centistokes at 77° F. is mixed with 95 parts of the polyethylene of Example 1. The resulting mixture after extrusion according to Example 1 is then blended with the virgin polyethylene of Example 1 in a ratio of 1 part of extruded mixture to 9 parts of virgin polyethylene, and the blend is extruded in the form of a film according to the procedure of Example 1. The cling properties of the resulting film and several other films prepared in the same manner, but containing varied amounts of the polyepichlorohydrin are shown in the following Table II. A control sample film (C) of virgin polyethylene is similarly tested and the results are shown in Table II for purposes of comparison.

TABLE II

|  | Percent additive | Cling[1] |
|---|---|---|
| Sample number: | | |
| 1 | 0.5 | 100+ |
| 2 | 0.25 | 100+ |
| 3 | 0.125 | 92 |
| C* | 0 | 13.6 |

[1] Same as footnote 2 in Table I.
*Not an example of the invention.

EXAMPLE 3

Polyethylene films containing the internal additives of Examples 1 and 2 were prepared essentially according to the procedure of Example 1 except increased amounts of polypropylene glycol were added to the polyethylene and the film was extruded onto a chilled roll having numerous protrusions, thus giving the film an embossed surface. The resulting films were tested for cling properties and the results are shown in the following Table III. A control sample of virgin polyethylene film (C) also having an embossed surface was tested and the results are shown in Table III for comparison purposes.

TABLE III

|  | Additive | Percent additive | Cling[1] |
|---|---|---|---|
| Sample number: | | | |
| 1 | Polypropylene glycol | 2 | 14 |
| 2 | do | 1 | 12 |
| 3 | Polyepichlorohydrin | 0.50 | 80+ |
| 4 | do | 0.25 | 18 |
| C* | | 0 | 5 |

[1] Same as footnote 2 in Table I.
*Not an example of this invention.

What is claimed is:

1. In the art of extruding thin, transparent films of polymerized olefins, a method for improving the cohesion properties of said films comprising the steps of (a) intimately admixing with normally solid polymerized olefin from about 0.04 to about 4 weight percent of an internal additive consisting essentially of a liquid polyalkylene ether diol having molecular weight up to about 5,000, vapor pressure below atmospheric pressure at temperatures just above the film melt extrusion temperature used in the following step (b), and Saybolt viscosity of at least 100 centistokes at 77° F. and (b) extruding the resulting mixture in the form of a thin, transparent flexible sheet.

2. The method according to claim 1 wherein the transparent sheet is extruded onto a chill roll and drawn down to form a film having a thickness between about 0.3 mil and about 2.0 mils.

3. The method according to claim 1 wherein step (a) is carried out in a screw type extruder equipped with a liquid inlet placed along the barrel of the extruder.

4. The method according to claim 1 wherein the polymerized olefin is polyethylene.

5. In the art of extruding thin, transparent films of polymerized olefins, a method for improving the cohesion properties of said films consisting essentially of the steps of (a) intimately admixing with normally solid polymerized olefin from about 0.04 to about 4 weight percent of a liquid polypropylene glycol having molecular weight up to about 5,000, vapor pressure below atmospheric pressure at temperatures just above the film melt extrusion temperature used in the following step (b), and Saybolt viscosity of at least 100 centistokes at 77° F. and (b) extruding the resulting mixture in the form of a thin, transparent flexible sheet.

6. The method according to claim 5 wherein the polypropylene glycol has a molecular weight of 2000.

References Cited

UNITED STATES PATENTS

| | | | |
|---|---|---|---|
| 2,879,244 | 3/1959 | Coler | 260—DIG. 15 |
| 3,070,462 | 12/1962 | McConnell | 117—121 |
| 3,108,011 | 10/1963 | Frotscher | 260—DIG. 15 |
| 3,121,914 | 2/1964 | Olson et al. | 264—211 |
| 3,387,073 | 6/1968 | Larsen | 264—211 |
| 3,499,950 | 3/1970 | Weitzel et al. | 260—33.2 R |

FOREIGN PATENTS

| | | | |
|---|---|---|---|
| 1410262 | 1965 | France | 264—328 |

ROBERT F. WHITE, Primary Examiner

G. AUVILLE, Assistant Examiner

U.S. Cl. X.R.

260—33.2 R; 264—211

PO-1050
(5/69)

UNITED STATES PATENT OFFICE
CERTIFICATE OF CORRECTION

Patent No. 3,658,980    Dated    25 April 1972

Inventor(s)   Robert Joseph Caiola, William F. Mick and Oliver Bernard Amley

It is certified that error appears in the above-identified patent and that said Letters Patent are hereby corrected as shown below:

Column 2, line 61, delete "esters;" and insert --ethers;--.

Column 5, line 13, delete "seevral" and insert --several--.

Column 5, Table I, the fifth line from the bottom of footnote 1, change "force is pounds" to --force in pounds--.

Column 5, Table I, the third line from the bottom of footnote 1, delete "about" and insert --above--.

Column 5, line 72, delete "1.070" and insert --1,070--.

Signed and sealed this 10th day of October 1972.

(SEAL)
Attest:

EDWARD M. FLETCHER, JR.              ROBERT GOTTSCHALK
Attesting Officer                    Commissioner of Patents